United States Patent [19]

Takahashi et al.

[11] Patent Number: 4,594,596
[45] Date of Patent: Jun. 10, 1986

[54] LASER BEAM RECORDING METHOD

[75] Inventors: Tsunehiko Takahashi, Asaka; Sigenori Yoneya, Tokyo, both of Japan

[73] Assignee: Fuji Photo Filmco., Ltd., Minami-ashigara, Japan

[21] Appl. No.: 710,955

[22] Filed: Mar. 14, 1985

Related U.S. Application Data

[63] Continuation of Ser. No. 164,948, Jul. 1, 1980.

[30] Foreign Application Priority Data

Jul. 4, 1979 [JP] Japan ................................. 54-84661

[51] Int. Cl.$^4$ ........................ G01D 9/40; G01D 15/14
[52] U.S. Cl. ................................. 346/76 L; 346/108
[58] Field of Search ...................... 346/1.1, 76 L, 108; 354/5; 358/285, 293, 296-302

[56] References Cited

U.S. PATENT DOCUMENTS 4,251,821 2/1981 Kimura ............................... 346/108

OTHER PUBLICATIONS

*How to Design and Use Multivibrators*, Jul. 29, 1974, pp. 60-62, Courtney Hall, "Triggering Techniques".
IBM Technical Disclosure Bulletin, vol. 11, No. 4, Sep. 1968, p. 405, "Multichannel Light Deflection System", Fleisher & Lipp.

*Primary Examiner*—Thomas W. Brown
*Attorney, Agent, or Firm*—Fleit, Jacobson, Cohn & Price

[57] ABSTRACT

In a laser beam scanning system for recording information of characters and/or marks on a heat mode recording material, the pulses used for modulating the laser beam according to the information to be recorded are extended by 10% to 100%. By the extension, the dots or the minimum elements recorded on the recording material are expanded in the main scanning direction. Thus, the thickness of the lines constituting the character or the like are recorded in the constant thickness both in the vertical and horizontal directions. The pulses are delayed and the delayed pulses are added to the original pulses to obtain a logical sum thereof, thereby obtaining extended pulses. Alternatively, the fall of the pulses is detected and other pulses are generated upon detection of the fall, and the original pulses and the other generated pulses are added together to obtain extended pulses.

7 Claims, 12 Drawing Figures

→ MAIN SCANNING DIRECTION

↓ SUB-SCANNING DIRECTION

SERIAL DOT SIGNAL (S6)

DELAYED SIGNAL (S7)

LOGICAL SUM SIGNAL (S8)

SERIAL DOT SIGNAL (S6)

DIFFERENTIAL SIGNAL

PULSE (P)

LOGICAL SUM SIGNAL (S9)

LASER BEAM RECORDING METHOD

This application is a continuation of application Ser. No. 164,948, filed July 1, 1980.

BACKGROUND OF THE INVENTION

1. Field of the Invention

This invention relates to a laser beam recording system, and more particularly to an improvement in a system of recording characters by a laser beam scanning device.

2. Description of the Prior Art

The laser beam recording device or scanning device referred to in this application means a device which uses a laser beam as a light source and modulates the laser beam by a character signal and causes the laser beam scan on a recording material in a main scanning direction and a sub-scanning direction to record characters and/or marks in a dot pattern. As the examples which use the laser beam recording device are known press facsimile, remote sensing image recording device, COM (computer output microfilmer), type photo-composing machine, printing plate exposure device, video disc master recording device, data recording device, etc.

The reason for using a laser beam as the light source is mainly the high energy and high concentration it has and accordingly is in that the recording can be conducted at a high speed with high density on a low sensitive recording material. As the low sensitivity recording material, are known so-called heat mode recording materials having a recording layer of a single or multilayer of metal, semi-metal or non-metal like a semi-conductor or a layer of vacuum deposition of alloy. These low sensitive recording materials are advantageous in that no developing process is needed and the recording process can be conducted in a bright room or under bright safety light.

However, when a laser beam recording is conducted on the low sensitive recording material of heat mode type, the dots recorded on the material constitute a character "E" in FIG. 1 fat in the direction perpendicular to the main scanning direction (sub-scanning direction) of the laser beam. Since the character recorded is constituted of a number of elements of dots of square shape, the fatting in the sub-scanning direction makes the shape of the character deformed and illegible. This phenomenon is considered to be based on the excessive energy of the scanning laser beam spreading in the sub-scanning direction. The degree of the fatting has been proved as a result of tests to be from about 10% to about 100% of the width of the dots depending on the material used.

SUMMARY OF THE INVENTION

The object of the present invention is to provide a laser beam recording system in which the thickness of the lines constituting characters recorded thereby is made constant.

A more specific object of the present invention is to provide a laser beam recording system for recording characters or marks on a heat mode recording material in which the thickness of the lines constituting the characters or marks recorded thereby is made constant.

The laser beam recording system in accordance with the present invention is characterized in that the pulses used for recording the characters are extended by 10% to 100% of the length of the minimum element or dot of the dot pattern in the main scanning direction and the laser beam scanning is made by use of the laser beam modulated by the extended pulses. The minimum element of the dot pattern referred to above means the element constituting the dot pattern which cannot be further divided. Generally, the minimum element corresponds to one dot in case of a single line scanning system and four dots arranged at corners of a square in case of a double line scanning system.

In accordance with the laser beam scanning system in accordance with the present invention, the dots recorded on the heat mode recording material are extended in the main scanning direction by extending the pulses as well as in the sub-scanning direction, and accordingly the thickness of the lines which constitute the character to be recorded is made equal both for vertical and horizontal lines. Thus, the characters and marks recorded are made legible.

DESCRIPTION OF THE PREFERRED EMBODIMENTS

Figure 2:
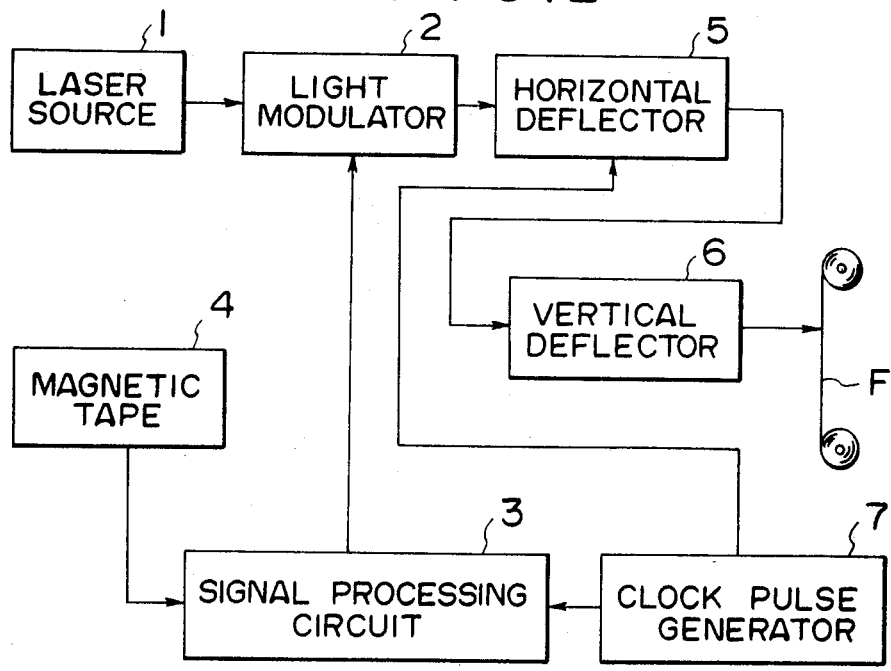
FIG. 2 is a block diagram of a laser beam recording device used for carrying out the laser beam recording system in accordance with the present invention.

Now a preferred embodiment of the present invention will be described in detail with reference to FIGS. 2 to 5. As shown in FIG. 2, a laser source 1 emits a laser beam. The laser beam is modulated by a light modulator 2 which is connected with a signal processing circuit 3. The light modulator 2 is controlled by the signal processing circuit 3, which is connected with a magnetic tape device 4 in which information is memorized. The information memorized in the magnetic tape device 4 is sent to the signal processing circuit 3 and is processed there to control the light modulator 2 and turn on and off the laser beam from the laser source 1. The modulated laser beam is deflected in the main scanning direction by a horizontal deflector 5 and in the sub-scanning direction by a vertical deflector 6 to record the information on a heat mode recording material F. The horizontal deflector 5 and the signal processing circuit 3 are connected with a clock pulse generator 7 to be provided with clock pulses therefrom.

Figure 3:
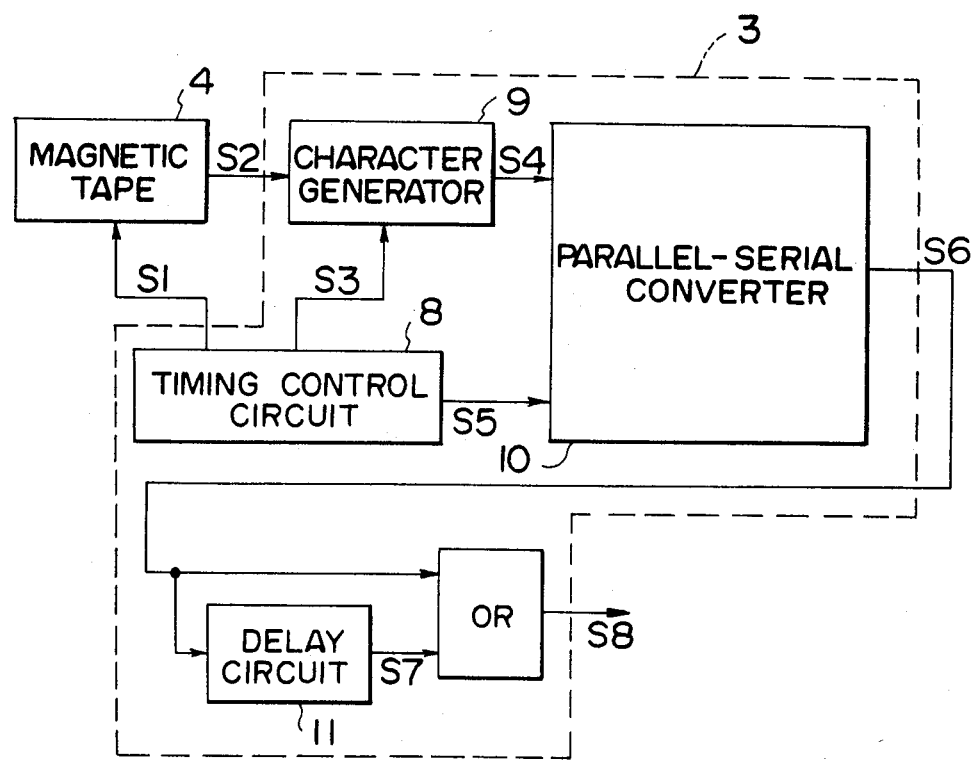
FIG. 3 is a block diagram of an example of a signal processing circuit used for a laser beam recording device as shown in FIG. 2, FIGS. 4A, 4B and 4C are time charts showing the waveform of the pulses processed by the signal processing circuit.

The signal processing circuit 3 will be described in more detail with reference to FIG. 3. The magnetic tape device 4 is a memory which memorizes the data of the characters to be recorded in a coded form and is controlled by a control signal S1 from a timing control circuit 8. The signal processing circuit 3 has a character generator 9 connected with the magnetic tape device 4. The character generator 9 is a character signal generating read only memory which outputs a parallel dot signal S4 upon receipt of inputs of a character code signal S2 read out from the magnetic tape device 4 and the control signal S3 from the timing control circuit 8.

Figure 1:
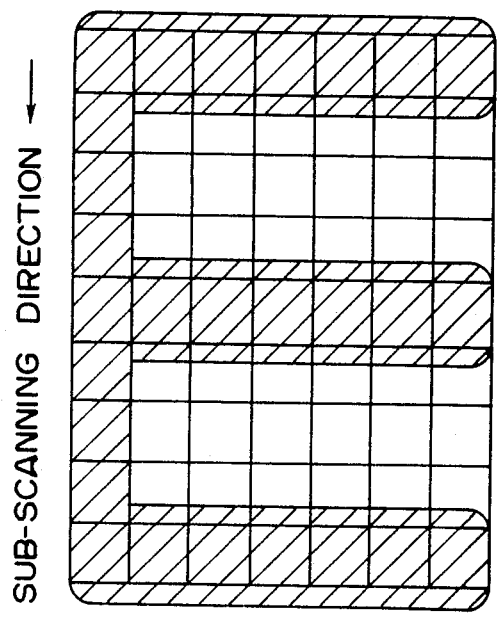
FIG. 1 is a view showing a sample of a character recorded by the conventional laser beam recording system.

The parallel dot signal S4 is input into a parallel-serial conversion circuit 10 and is converted to a serial dot signal S6 according to a control signal S5 from the timing control circuit. If the serial dot signal S6 is input into the light modulator 2 to modulate the laser beam from the laser source 1 and the information (for instance a character "E") is recorded on the heat mode recording material F by the laser beam thus modulated, the character recorded becomes as shown in FIG. 1 in which the lines constituting the character fat in the sub-scanning direction.

The present invention aims to substantially extend the length of the dots in the main scanning direction by extending the length of the pulses of the serial dot signal S6 and extending the time of turning on of the laser beam from the normal turning on time. In order to extend the length of the pulses of the serial dot signal, a delayed signal S7 obtained by inputting the serial dot signal into a delay circuit 11 and the serial dot signal S6 as it is are input into an OR circuit 12 to provide a logical sum thereof. The logical sum signal S8 is input into the light modulator 2 as an extended serial dot signal.

Figure 4A:
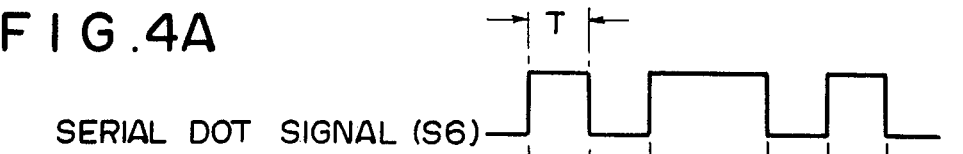
Figure 4B:
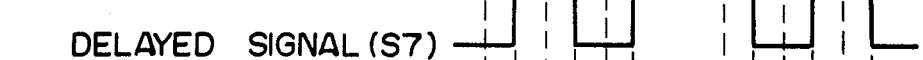
Figure 4C:
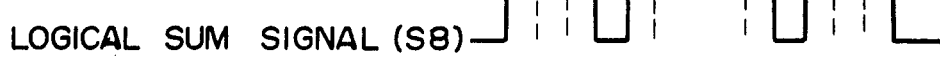

FIGS. 4A to 4C show the serial dot signal S6, the delayed signal S7 and the obtained logical sum signal S8. The time "T" shows the time for one dot for the serial dot signal S6. The one dot corresponds to the minimum element constituting the character formed in a dot pattern. The minimum element is constituted of four dots in case of the double line scanning system. The serial dot signal S6 is delayed by the time of dT by the delay circuit 11. The delay time dT is determined by the brightness level of the recording device, the response time of the light modulator, the recording characteristics of the recording material and so forth. As a result of tests, it has been proved that the degree of fatting of the recorded line in the sub-scanning direction is about 10% to about 100% of the width of the minimum element. Therefore, the delay time is also made 10% to 100% of the time T. FIG. 4 shows an example in which the delay time dT is 50% of the time T.

Figure 5:
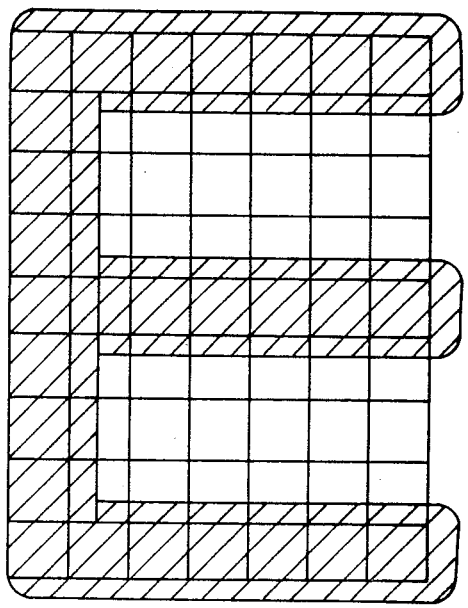
FIG. 5 is a view showing a sample of a character recorded by the laser beam recording system in accordance with an embodiment of the present invention employing a signal processing method as shown in FIG. 3.

By the delayed signal S7 and the serial dot signal S6, a logical sum signal S8 serving as an improved serial dot signal is obtained. The improved serial dot signal S6 is used for recording the character on a head mode recording material. An example of the character "E" thus recorded on the recording material is shown in FIG. 5. As clearly observed in FIG. 5, the recorded character has the equal thickness in both the vertical and horizontal directions and is accordingly very legible.

Figure 6:
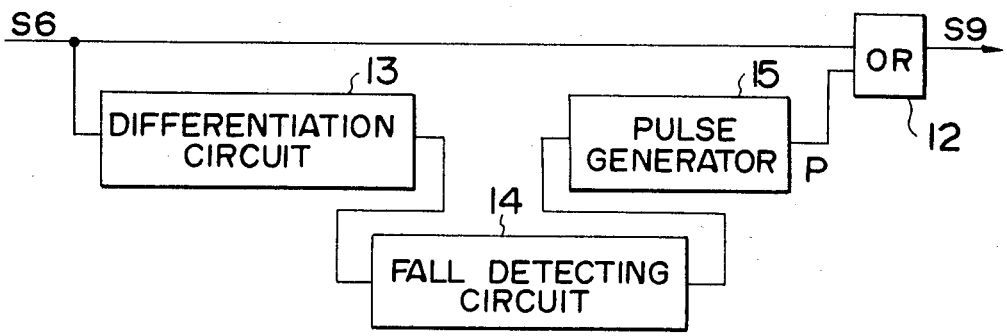
FIG. 6 is a block diagram showing a variation of a circuit for extending pulses of the signal processed by the circuit as shown in FIG. 3, and FIGS. 7A to 7D are time charts showing the waveform of the pulses processed by the signal processing circuit as shown in FIG. 6.
Figure 7A:
Figure 7B:
Figure 7C:
Figure 7D:

Another embodiment of the present invention in which the serial dot signal is delayed in a different way will be described with reference to FIGS. 6 and 7. Referring to FIG. 6, the serial dot signal S6 from the parallel-serial conversion circuit 10 is input into a differentiation circuit 13. The differentiation circuit 13 generates a positive pulse at the rise of a pulse and generates a negative pulse at the fall of the pulse. The differentiation circuit 13 is connected to a fall detecting circuit 14 which detects the fall of the serial dot signal S6 by detecting the negative pulse. The fall detecting circuit 14 detects the fall of the pulse and generates a detecting signal which is input into a pulse generator 15. The pulse generator 15 generates a single pulse P upon receipt of the detecting signal. The pulse P generated by the pulse generator 15 is added to the original serial dot signal S6 by an OR circuit 12. Thus, a logic sum signal S9 is obtained and input into the light modulator 2. In the example as shown in FIGS. 7A to 7D, the serial dot signal extended by 100% in the main scanning direction of the minimum element. In case of the double line scanning recording system, the extension of 100% results in extension of 50% of the minimum element since the minimum element consists of four dots and two dots in the main scanning direction. By controlling the width or length of the pulse P generated by the pulse generator 15, it is possible to extend the pulse of the signal continuously to a degree ranging from about 10% to 100%.

We claim:

1. A laser beam recording system for recording information in the form of characters and/or marks on a recording material, said system comprising:
    a laser source for producing a laser beam;
    modulating means responsive to an input signal for modulating said laser beam;
    first deflector means for deflecting said modulated laser beam in a main scanning direction to record an image on the recording material;
    second deflector means for deflecting said first deflected modulated laser output in a sub-scanning direction perpendicular to the main scanning direction to record a further image on the recording material; and
    signal processing means for producing said input signal for use by said modulating means, said signal processing means including means for generating a dot signal, and means for extending the duration of said dot signal, said extended dot signal constituting said input signal.

2. The laser beam recording system as defined in claim 1 wherein said extending means comprises delaying means for delaying said dot signal to obtain a delayed dot signal, and adding the delayed dot signal to the dot signal, thereby obtaining the input signal.

3. The laser beam recording system as defined in claim 1 wherein said extending means comprises detecting means for detecting a fall of said dot signal, generating means for generating pulses upon detecting the fall, and adding means for adding the pulses to said dot signal thereby obtaining said extended dot signal.

4. The system of claim 1, wherein said signal processing means comprises:
    a signal generating circuit for generating a serial dot signal;
    a differentiation circuit connected to said signal generating circuit for differentiating said serial dot signal to obtain a differentiated output signal, said differentiated output signal having a rise and a fall;
    a fall detecting circuit connected to said differentiation circuit for detecting the fall of said differentiation output signal and issuing a fall detection output;
    a pulse generator responsive to said fall detection output for generating a pulse; and
    an OR circuit responsive to said serial dot signal and to said pulse for performing an OR operation with respect to said serial dot signal and said pulse to generate a modulating output signal which constitutes the input signal for modulating the laser beam.

5. A laser beam recording method for recording information in the form of characters and/or marks on a recording material, said method comprising the steps of:
 modulating a laser beam by an input signal to develop a modulated laser beam;
 deflecting said modulated laser beam in a main scanning direction to record an image on the recording material;
 deflecting said first deflected modulated laser beam in a sub-scanning direction perpendicular to the main scanning direction to record a further image on the recording material;
 generating a dot signal;
 extending the duration of the dot signal; and
 having the extended signal constitute the input signal for modulating the laser beam.

6. The laser beam recording method as defined in claim 5 wherein said extending step comprises delaying said dot signal to obtain a delayed dot signal, and adding the delayed dot signal to the dot signal, thereby obtaining the input signal.

7. The laser beam recording method as defined in claim 5 wherein said extending step comprises detecting a fall of said dot signal, generating pulses upon detecting the fall, and adding the pulses to said dot signal thereby obtaining said extended signal.

* * * * *